United States Patent
Prabdial et al.

(10) Patent No.: US 10,455,402 B2
(45) Date of Patent: *Oct. 22, 2019

(54) IDENTITY MODULE WITH INTERCHANGEABLE UNIQUE IDENTIFIERS

(71) Applicant: Vodafone IP Licensing Limited, Newbury, Berkshire (GB)

(72) Inventors: Yakeen Prabdial, Newbury (GB); Richard Gumbrell, Newbury (GB); Najib Koraichi, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,776

(22) Filed: Dec. 19, 2016

(65) Prior Publication Data
US 2017/0099601 A1 Apr. 6, 2017

Related U.S. Application Data

(63) Continuation of application No. 14/254,640, filed on Apr. 16, 2014, now Pat. No. 9,526,008.

(30) Foreign Application Priority Data

Apr. 16, 2013 (GB) .................................. 1306872.1

(51) Int. Cl.
*H04W 8/04* (2009.01)
*H04W 8/18* (2009.01)
(Continued)

(52) U.S. Cl.
CPC ............. *H04W 8/04* (2013.01); *H04W 8/183* (2013.01); *H04W 12/04* (2013.01); *H04W 12/06* (2013.01);
(Continued)

(58) Field of Classification Search
CPC ....... H04W 8/04; H04W 12/04; H04W 12/08; H04W 8/183; H04W 12/06; H04W 12/00405; H04W 12/00514; H04W 88/06
See application file for complete search history.

(56) References Cited

U.S. PATENT DOCUMENTS 6,738,622 B1 5/2004 Stadelmann et al.
7,646,713 B1 1/2010 Absillis et al.
(Continued)

FOREIGN PATENT DOCUMENTS

DE 10225033 12/2003
GB 2491392 A 12/2012

OTHER PUBLICATIONS

GB Search Report for GB1306872.1 dated Oct. 8, 2013.
European Search Report for EP 14 16 4816 dated Jun. 25, 2014.

*Primary Examiner* — Eleni A Shiferaw
*Assistant Examiner* — Cheng-Feng Huang
(74) *Attorney, Agent, or Firm* — Workman Nydegger (57) ABSTRACT

A telecommunications system is provided, comprising a plurality of different cellular telecommunications networks, an identity module registrable on the plurality of different networks and containing multiple unique identifiers, each unique identifier being associated with a respective network; and, a device, operative in accordance with the identity module, to communicate with the networks when the identity module is registered on that network. The identity module comprises a common security key associated with at least two of the unique identifiers such that the identity module is registrable on each one of the plurality of networks when a unique identifier of the identity module and its associated security key are authenticated for that network.

20 Claims, 7 Drawing Sheets

(51) Int. Cl.
   *H04W 12/04*   (2009.01)
   *H04W 12/06*   (2009.01)
   *H04W 12/08*   (2009.01)
   H04W 88/06     (2009.01)
   H04W 12/00     (2009.01)

(52) U.S. Cl.
   CPC ...... *H04W 12/08* (2013.01); *H04W 12/00405* (2019.01); *H04W 12/00514* (2019.01); *H04W 88/06* (2013.01)

(56) References Cited

U.S. PATENT DOCUMENTS

| | | | |
|---|---|---|---|
| 2004/0121805 A1* | 6/2004 | Kikuchi | H04L 41/00 |
| | | | 455/560 |
| 2005/0055578 A1 | 3/2005 | Wright et al. | |
| 2008/0250478 A1 | 10/2008 | Miller et al. | |
| 2009/0083534 A1 | 3/2009 | Challener et al. | |
| 2009/0220064 A1 | 9/2009 | Gorti et al. | |
| 2010/0075668 A1 | 3/2010 | Pan | |
| 2011/0059738 A1 | 3/2011 | Waller | |
| 2012/0182938 A1* | 7/2012 | Mujtaba | H04W 88/06 |
| | | | 370/328 |
| 2012/0282891 A1 | 11/2012 | Mohammed et al. | |
| 2012/0282924 A1* | 11/2012 | Tagg | H04W 60/06 |
| | | | 455/432.1 |
| 2013/0231087 A1* | 9/2013 | O'Leary | H04W 8/22 |
| | | | 455/411 |
| 2014/0228039 A1 | 8/2014 | Zhao et al. | |
| 2014/0302785 A1 | 10/2014 | Arora et al. | |
| 2014/0310785 A1 | 10/2014 | Prabdial et al. | |

* cited by examiner

IDENTITY MODULE WITH INTERCHANGEABLE UNIQUE IDENTIFIERS

CROSS REFERENCE TO RELATED APPLICATIONS

This application is a Continuation of U.S. application Ser. No. 14/254,640 filed Apr. 16, 2014, which is expressly incorporated herein by reference. U.S. patent application Ser. No. 14/254,640 claims priority to United Kingdom Number GB1306872.1, filed on Apr. 16, 2013, the entirety of which is incorporated herein by reference.

BACKGROUND OF THE INVENTION

In mobile telecommunications systems such as that of the GSM, UMTS (third generation or 3G), CDMAOne, CDMA2000 (including other CDMA variants), LTE or LTE Advanced type, transmitting and receiving terminals (telephone handsets, for example) are provided with individual smart cards or Subscriber Identity Module (SIM) cards which are used to activate the terminals.

In telematics applications, SIM cards are used for analogous purposes—providing the relevant identification and authentication information for each telematics terminal. In certain telematics applications, the SIM may not be provided on a card but on an integrated circuit implanted or integrated into the device. This may, for example, take the form of a VQFN8 package for standardised installation.

Each SIM will be specific to a particular network (the "home" network)—that is, it will have been issued under the control of the operator of that network and will be for use within that network.

SIM cards are specific to the customers and carry information particular to each customer such as the customer's International Mobile Subscriber Identifier (IMSI) together with authentication information, including the individual subscriber authentication key (Ki). Traditionally, the IMSI will be from a range of IMSIs assigned by an issuing authority, for example the International Telecommunications Union (ITU), to the service provider.

Conventionally, there is a one-to-one mapping between the IMSI, Ki and the service provider responsible for issuing the SIM. There is a fundamental assumption throughout the telecommunications field that this one-to-one relationship is the only way to operate a telecommunications network, i.e. there is a deep-seated belief that each IMSI of a SIM must be intrinsically coupled to one security key and one service provider.

Each Ki is intrinsically linked to an IMSI as the IMSI is used as part of the algorithm that generates the Ki. Each network operator may use a different algorithm to generate the Ki, thus maintaining the one-to-one relationship between IMSI, Ki and provider.

It is an essential security requirement of telecommunications systems that the individual subscriber authentication key (Ki) of the SIM is only ever stored at two points of the network, i.e. on the SIM and at the authentication centre (AuC). Additionally, neither the Ki, nor the algorithm that generated it can be shared or transmitted in any sense, whatsoever. In fact, the removal or transmission of the Ki from the SIM at any point after manufacture is illegal in some territories.

In a conventional telecommunications system, the Ki is paired on the SIM with the International Mobile Subscriber Identity (IMSI) of the SIM at the point of manufacture. It has long been a problem for telecommunications network providers that only the IMSI and hence its intrinsically coupled Ki, dictates which network a device can connect to natively and which networks the device can roam onto. It is not presently feasible for a SIM to connect natively to, or inherit the footprint of, a variety of networks because the Ki, as mentioned above, is not transmittable, transferable or programmable. The territoriality of network operators and the telecommunications regulatory framework has ensured that this is the case.

In telematics applications, the conventional SIM and network arrangement is less than satisfactory. For example, a telematics terminal with its SIM card may be incorporated into a product when located in one country (for example during manufacture of the product) but the product may then be exported for use in another country. The eventual destination of the product may be unknown at the time when the terminal and its SIM card are incorporated into the product. For example, a telematics terminal may be incorporated into a vehicle for use not only for providing telephone and data services for an occupant of a vehicle but also for transmitting other information relating to the operation of a vehicle such as, for example, concerning its maintenance or breakdown or relating to its position. In such a case, the initial home network for the SIM card may be a network in a country where the vehicle is manufactured and where the telematics terminal is installed. Thus, it may be necessary to render the SIM card active at this stage in order to enable testing and set up to be carried out. However, the vehicle may then be exported to another country where it will actually be used or primarily used—in which case it will be necessary for the SIM card to be registered to a different home network.

Similarly, if a telematics terminal with its associated SIM card is in use within a product and functioning within a particular operating company's network, problems will arise if the product is then moved permanently into a different geographical region not covered by the network with which it is registered. Although roaming on a terminal into a different network is possible, this is intended for short term movements of a terminal into the different network, not a substantially permanent or long-term transfer. In such cases, it will of course be possible to deal with the problem simply by issuing a new SIM card upon the transfer of the product including telematics terminal into the area of a different network. However, this could be logistically difficult in practice, and, additionally, could have the result that useful information placed on the previous SIM card would be lost. Moreover, in certain telematics applications, where the SIM is not stored in the form of a smart card but on an integrated circuit implanted into a device, a SIM replacement may not be possible.

Previous attempts to design a SIM capable of registering and re-registering on multiple networks have been based on the principle of producing multiple instances of a single SIM within one 'super SIM' which is then able to pick an IMSI-Ki pair to be used in each situation, i.e. when registering and re-registering on multiple networks. There are however many disadvantages inherent to such a system.

For example, as the SIM is effectively multiple SIMs placed within the same SIM, there is an inherent ambiguity as to who would be the owner of the 'super SIM'. Each IMSI-Ki pair would be considered the property of a network in each territory or the organisation responsible for the issuance of each IMSI-Ki pair.

The 'super SIM' also provides an inconsistency in security and service. For example, each Ki of the 'super SIM' may have been generated using a different algorithm. Some of these encryption algorithms are very weak. The breaking of such a weak algorithm would compromise the security of the entire module. As each IMSI-Ki pair is essentially an individual SIM of different providers, there is an inherent inconsistency.

Further, in conventional telecommunications networks, authentication of the SIM is carried out by a location register acting as an authentication centre. If each IMSI-Ki pair of the 'super SIM' corresponds to an individual territory or network, that individual network must be responsible for the authentication. (As mentioned above, the security key can never be transmitted; neither can the algorithm that generates the authentication signals). As a result, when a device with multiple IMSI-Ki pairs attempts to connect to a network, the local network must communicate with a large number of location registers in a plurality of disparate locations in order to authenticate the device on the network.

The routing between local registers may also be such that a large operating overhead is added to the system, for example, in terms of speed, functionality and quality of service. In many circumstances there are specific national routes that must be followed by communications, particularly when travelling across oceans; there are potentially a number of different routes for communications to travel between location registers. As such, the authentication and communication is prohibitively inconsistent. This may be exacerbated by, for example, SS7 congestion. Moreover, to operate such a disparate system, a large number of costly licences is required to run the plurality of distinct location registers.

It would be highly desirable to provide an identity module which is natively operable on a variety of different networks and which can interchangeably uniquely identify itself to a network using unique identifiers associated with a variety of different territories and/or networks. Moreover, it would be desirable to provide such a module, whilst also providing improved consistency of routing minimising the back end system components and hence the operating overheads.

SUMMARY OF THE INVENTION

According to a first aspect of the present invention there is provided a telecommunications system comprising a plurality of different cellular telecommunications networks; an identity module registrable on the plurality of different networks and containing multiple unique identifiers, each unique identifier being associated with a respective network; and, a device, operative in accordance with the identity module, to communicate with the networks when the identity module is registered on that network, wherein the identity module comprises a common security key associated with at least two of the unique identifiers such that the identity module is registrable on each one of the plurality of networks when a unique identifier of the identity module and its associated security key are authenticated for that network.

The present invention provides the ability to map multiple unique identifiers to one common security key. By breaking the previous dependence of telecommunications networks on the coupled relationship of the identity module's unique identifier and security key, the first aspect of the present invention provides the ability for a terminal to communicate natively with a plurality of different networks without the use of a number of different security keys of which there is a limited number. Additionally, the identity module may have an interchangeable unique identifier such that the identity module may appear to the network to originate from any number of territories and/or networks without compromising on the security of the device. In fact, security may be significantly increased as a consistent high security encryption algorithm can be used to generate the security key when compared to identity modules comprising multiple keys, each of which may be generated using a variety of algorithms which may not all provide adequate levels of security. Further, the functionality of the identity module is increased without compromising on the size of the identity module.

Preferably, the system comprises an authentication server for authenticating the unique identifier and its associated security key on the plurality of networks. In this way, authentication is provided centrally and as such, the security of the system of the present invention is at least comparable with that of conventional GSM telecommunications systems. At any one time, only two nodes in the system have knowledge of the security key regardless of the network the device attempts to connect to. Moreover, consistent routing is achieved as there is a central home for the common security key. Regardless of the location of the plurality of networks, the authentication path remains fixed and can be optimised accordingly.

Additionally, each of the plurality of networks may comprise a local location register for receiving requests to access the network from the device operative to re-direct the request to a central location register in accordance with the unique identifier, said central location register comprising the authentication server. Comparable security and functionality is thus maintained with legacy GSM systems. Moreover, the number of location register licences required is minimised.

The central location register may also be operative to instruct the local location register to grant the device access to its respective network if the authentication performed by the authentication server is successful.

Further, the identity module may attempt to connect to one of the plurality of networks using the unique identifiers in accordance with a predetermined sequence. In this way, the identity module can be initialised for use with a particular network and present itself to the network using the unique identifier having the highest priority.

The predetermined sequence may be retained on the card as sequence data. Additionally, power may be maintained to the identity module and the device when the identity module attempts to connect using the unique identifiers. In this way, device functionality is improved as a full re-start, or shutdown of the device and/or smart card is not required to change the unique identifier used by the identity module. The speed of use is dramatically increased, as is the speed of connection and rate at which full functionality can be achieved following an identified need for re-connection.

The authentication server may authenticate the identity module for a particular network using a particular unique identifier in dependence on one or more criteria selected from a group comprising cost, cellular coverage, signal strength and predicted device functionality on the network. This provides the authentication server with the ability to dictate which unique identifier is used by the identity module, as the authentication server may retain knowledge of the predetermined sequence. The authentication server may thus force the identity module to appear to the local network with a particularly originated identifier. The authentication server may base the rejection upon a number of criteria which may increase functionality and user experience and lower cost for the user. This is particularly advantageous, as previously it was impossible for the device to beneficially mimic its appearance to the network as originating from another network or territory.

In another embodiment, the system further comprises a service platform in communication with the network, operative to instruct the identity module to reorder the sequence of unique identifiers, wherein the identity module is operative to reorder the sequence of identifiers upon instruction. The provision of a service platform allows for fully controllable operation of the system from a central location, in addition to providing enhanced functionality. The identity module may be operative to transmit diagnostic data to the service platform. The service platform is thus able to monitor the functionality of the device on the network when the identity module connects to the network using a particular unique identifier.

Additionally, the reordered sequence of unique identifiers may be calculated in dependence on one or more criteria selected from a group comprising the diagnostic data transmitted from the identity module, cost, cellular coverage, signal strength and predicted device functionality on the network. The service platform may thus instruct the identity module to use an optimal unique identifier for the given scenario.

The service platform may also be operative to transmit a new unique identifier to the identity module and authentication server to be associated with the common security key and, upon receipt of the new unique identifier, the identity module may be operative to add the unique identifier to the predetermined sequence. In this way, should any new agreements be created between networks, any new territories added to a network or any new networks added to a territory, the identity module can be readily remotely adapted without the need for replacement. The identity module can thus be adapted for any suitable application.

Further, the service platform may be operative to instruct the identity module to delete a unique identifier from the sequence and, upon instruction, the identity module may be operative to delete the unique identifier from the sequence. Additionally, the service platform may be operative to instruct the identity module to purge a unique identifier from the identity module and, upon instruction, the identity module may be operative to purge the unique identifier from the module. As with the addition of a new unique identifier, the identity module is thus readily remotely adaptable to any potential need for change of the unique identifiers used by the identity module.

Further, the service platform may be operative to instruct the identify module to modify one or more of the unique identifiers stored on the identity module and authentication server associated with the common security key and, upon instruction, the identity module and authentication server may be operative to modify one or more of the stored unique identifiers associated with the common security key. As with the addition and deletion of unique identifiers, the identity module is thus readily remotely adaptable to any potential need for change of the unique identifiers used by the identity module.

According to a second aspect of the present invention, there is provided an identity module for use in the telecommunications system of the first aspect of the present invention.

According to a third aspect of the present invention, there is provided a method of using a telecommunications system having a plurality of different cellular telecommunications networks, comprising: registering an identity module on a first one of the plurality of networks in accordance with a first unique identifier; registering an identity module on a second one of the plurality of networks in accordance with a second unique identifier; in which the identity module comprises a common security key associated with the first and second unique identifiers such that the identity module is registered on the networks when a unique identifier and its associated security key are authenticated for that network.

The first and second ones of the plurality of networks may be the same network. Additionally, the method may further comprise providing an authentication server and, at the authentication server, authenticating a unique identifier and its associated common security key on the first or second ones of the plurality of networks.

Also, the method may further comprise, at the authentication server, storing the first and second unique identifiers and common security key, each unique identifier being associated with the common security key. The method may further comprise providing a local location register and, at the local location register, receiving a request to access the network from a device operative in accordance with the identity module and redirecting the requests to a central location register in accordance with the unique identifier, said central location register comprising the authentication server.

Further, the method may further comprise, at the central location register, instructing the local location register to grant access to its respective network if the authentication performed by the authentication server is successful.

The identity module may also comprise at least two unique identifiers associated with the common security key, the method may also further comprise: attempting to register the identity module on one of plurality of networks using the unique identifiers in accordance with a predetermined sequence. Further, the method may also comprise, at the identity module, storing the predetermined sequence as sequence data.

Additionally, the method may further comprise maintaining power to the identity module when the identity module attempts to connect using the unique identifiers. The method may also further comprise, at the authentication server, authenticating the identity module for a particular network using a particular unique identifiers in dependence on one or more criteria selected from a group comprising cost, cellular coverage, signal strength and predicted device functionality on the network.

The method may also further comprise providing a service platform and, at the service platform, instructing the identity module to reorder the sequence of unique identifiers and, at the identity module, reordering the sequence of unique identifiers upon instruction. The method may further comprise, at the identity module, transmitting diagnostic data to the service platform. The method may further comprise, at the service platform, calculating the reordered sequence of unique identifiers in dependence on one or more criteria selected from a group comprising the diagnostic data transmitted from the identity module, cost, cellular coverage, signal strength and predicted device functionality on the network.

Further, the method may also comprise, at the service platform, transmitting a new unique identifier to the identity module and authentication server to be associated with the common security key and, at the identity module, adding the new unique identifier to the predetermined sequence upon receipt of the new unique identifier.

The method may further comprise, at the service platform, instructing the identity module to delete a unique identifier from the sequence, and, at the identity module, deleting the unique identifier from the sequence upon instruction. The method may also comprise, at the service platform, instructing the identity module to purge a unique identifier from the identity module, and, at the identity module, purging the unique identifier from the module upon instruction.

Additionally, the method may further comprise, at the service platform, instructing the identity module and authentication server to modify one or more of the unique identifiers stored on the identity module and authentication server and associated with the common security key, and at the identity module and authentication server, modifying one or more of the stored unique identifiers associated with the common security key.

According to a fourth aspect of the present invention, there is provided a network entity for use in a telecommunications system, the network entity being operative to communicate with at least one wireless telecommunications network and to authenticate an identity module for the said at least one wireless telecommunications network, wherein the identity module comprises a common security key associated with at least two unique identifiers such that the identity module is registrable on each one of the plurality of networks when a unique identifier of the identity module and its associated security key are authenticated by the network entity for that network.

DETAILED DESCRIPTION OF THE DRAWINGS

An example of the present invention will now be described in detail with reference to the accompanying drawings, in which.

DETAILED DESCRIPTION

Figure 1:
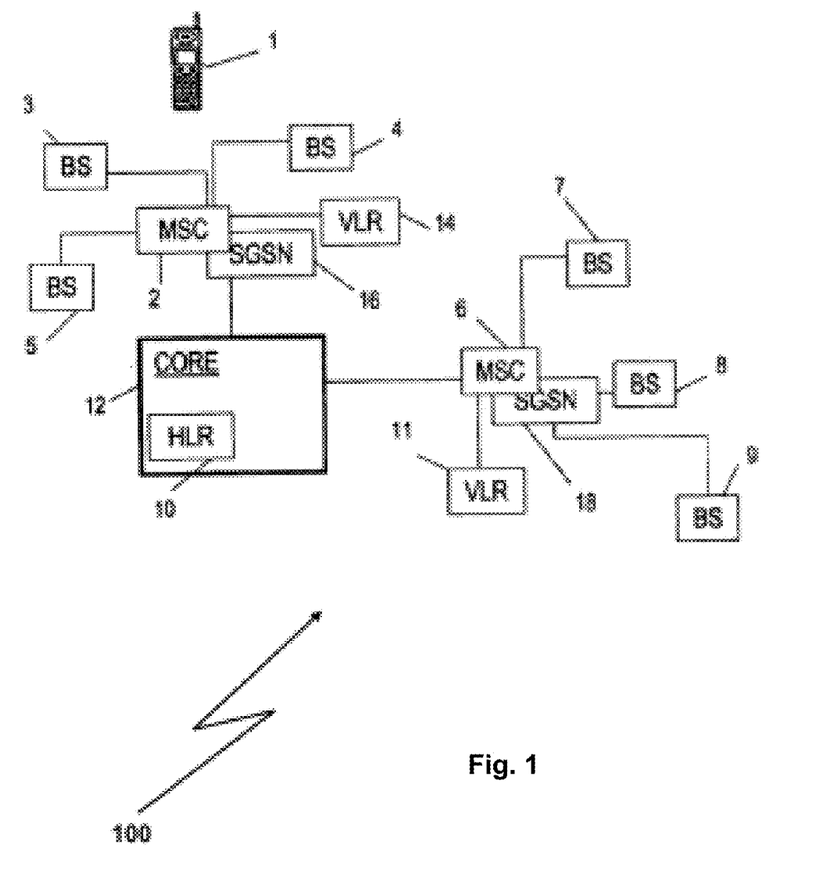
FIG. 1 shows a conventional telecommunications network.

A conventional telecommunications network is shown in FIG. 1. Conventional telecommunications networks 100 include a plurality of base stations (BS) 3, 4, 5, 7, 8 and 9 and a core network 12. Each base station (BS) corresponds to a respective cell of the telecommunications network and receives calls from and transmits calls to a mobile terminal in that cell of a wireless radio communication in one or both of the circuit switched or packet switched domains. Such a subscriber's mobile terminal is shown at 1. A mobile terminal may be a handheld mobile telephone, a personal digital assistant (PDA) or a laptop computer equipped with a data card among others.

Each base station comprises a base transceiver section (BTS) and a base station controller (BSC). A BSC may control one or more BTS. The BTSs and BSCs comprise the radio access network.

Conventionally, the base stations are arranged in groups and each group of base stations is controlled by one mobile switching centre (MSC), such as MSC 2 for base stations 3, 4, 5. As shown in FIG. 1, the network has another MSC 6, which is controlling a further three base stations 7, 8, 9. In practice, the network will incorporate many more MSCs and base stations than shown FIG. 1.

Each subscriber to the network is provided with at least one smart card or subscriber identity module (SIM) card (strictly speaking a "Universal Integrated Circuit Card", UICC) which, when associated with the user's mobile terminal, identifies the subscriber to the network. A terminal is a mobile device when equipped with a SIM. The terminal typically has an identifier of its own (the "International Mobile Equipment Identity", NEI), which can be obtained in certain networks, however this terminal ID is not essential in identifying the subscriber to the network. The SIM card is pre-programmed with a unique identification number, the "International Mobile Subscriber Identity" (IMSI) which can be accessed on the card but which is not generally known to (or used directly by) the subscriber. Printed on the outside of each SIM, there is a further unique identification number, the ICCID/SIM serial number (SSN), which is unrelated to the IMSI number. The subscriber is issued with a further, publically known, number, that is, the subscriber's telephone number, by means of which calls to the subscriber are initiated by callers. This number is the mobile subscriber ISDN number (MSISDN), which may be provisioned to the SIM at any point after manufacture. The MSISDN is not essential for the authentication or registration process and therefore its value or use is not essential to the present invention.

The cell network includes a home location register (HLR) 10 which, for each subscriber to the network, stores the IMSI and, indexed with it, the corresponding MSISDN together with other subscriber data, such as the current or last known location of the subscriber's mobile terminal. A second register, the visitor location register (VLR) 11 and 14, is used to store the IMSI and the corresponding MSISDN for subscribers that are active in the network temporarily. Throughout the present description, the term "location register" should be understood to relate to a network entity performing functionality of a HLR, a VLR and/or a network gateway component, such as serving GPRS support mode (SGSN) 16 and 18.

Figure 2:
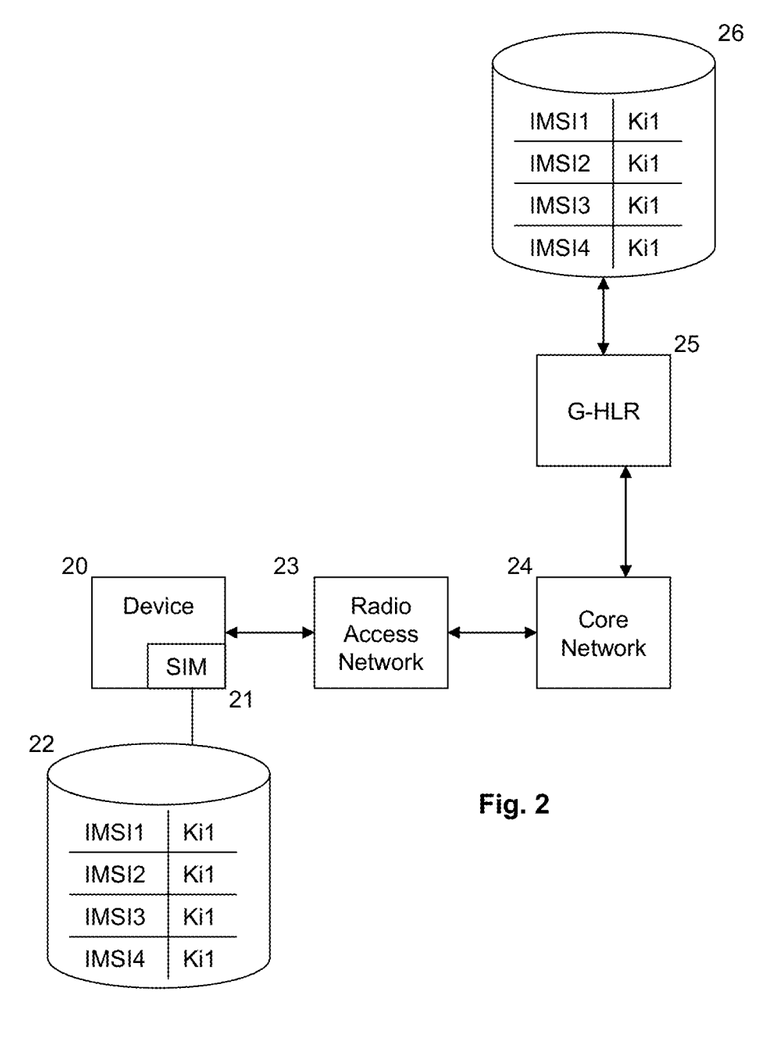
FIG. 2 shows a first embodiment of the present invention.

In the described telecommunications network, shown in FIG. 2, to handle the requests for a connection to the network, the network includes a global HLR (G-HLR) 25 in communication with a network of HLRs, VLRs and SGSNs 24. The skilled person will understand that the G-HLR 25 and network architecture are not essential to the functionality of the present invention and that the present invention can equally be used with conventional telecommunications networks. In the present exemplary embodiment, the G-HLR 25 stores the IMSI of the SIM in a database and not the HLR or VLR as in the conventional network described above.

When the subscriber wishes to activate their mobile terminal in the network (so that it may make or receive calls subsequently), the subscriber places their SIM card 21 in a card reader associated with the mobile terminal 20. The SIM 21 need not be a card inserted into a card reader, in fact, in many telematics and other applications, the SIM 21 is often a integrated circuit integrated or implanted within a device (for example as a 2FF, 3FF or VQFN8 package).

Figure 3:
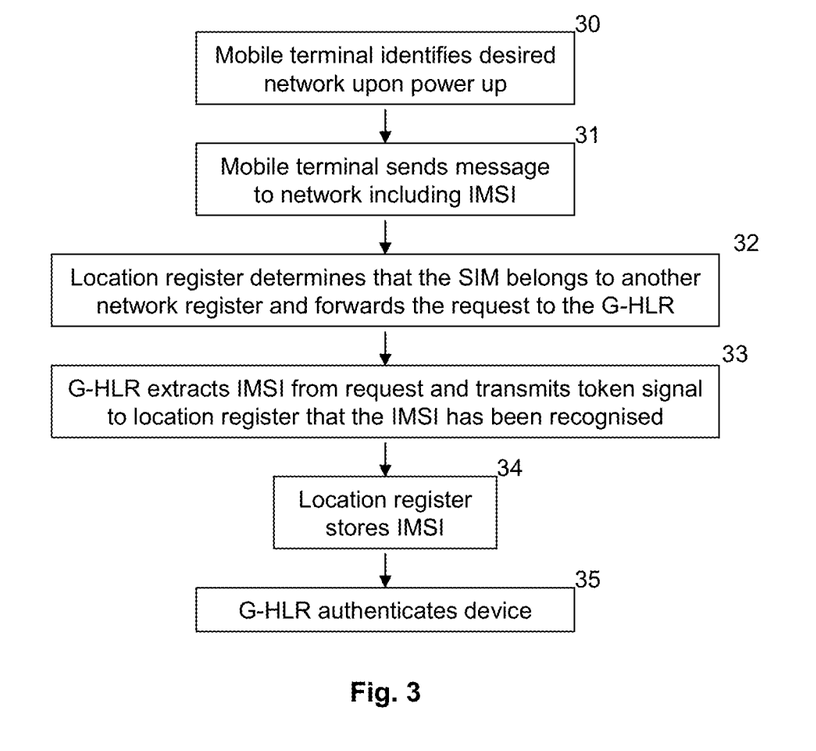
FIG. 3 shows a process of registering a device according to an embodiment of the present invention.

When the mobile terminal 20 is switched on, it searches for a mobile network to which to connect as shown in step 30 of FIG. 3, which demonstrates the steps described below. Once the mobile terminal identifies the desired network, it sends a message to the network (via the base station associated with a particular cell of that network in which the terminal is located) to indicate that it has entered into "idle state". This message includes the IMSI (read from the card) as shown in step 31.

Connection to the radio network 23 amounts to a request from the SIM 21 to access the appropriate location in the location register of the core network 24 (e.g. VLR, HLR or SGSN) for the transmitted IMSI number from the appropriate storage location. The location register determines that the IMSI number provided by the SIM 21 belongs to another network register (step 32). The request for connection is then forwarded to the G-HLR 25. The G-HLR 25 then extracts the IMSI number from this request and, assuming the IMSI number is in a range maintained by the G-HLR 25, transmits a token signal to the location register that the IMSI has been recognised by the G-HLR 25. This token signal may simply be a confirmation signal (an 'okay') but it may include further profile information (step 33).

The location register, upon receipt of the token signal, stores the IMSI (step 34) temporarily in a location in the visitor location register, the visitor location store or the SGSN location register store. In this way, therefore the user of the terminal is effectively registered with a particular MSC (step 35), and any profile information associated with the SIM is temporarily stored in the VLR associated with that MSC (or the SGSN location register store where the SGSN acts as the location register).

Once the above steps have been completed, an authentication procedure is then performed for the mobile terminal 20. The G-HLR 25 transmits authentication data to the MSC 23 in "challenge" and "response" forms. Using this data, the MSC or SGSN passes a "challenge" to the mobile terminal through the base station. Upon receipt of this data, the mobile terminal passes this data to its SIM and produces a "response". This response is generated using an encryption algorithm on the SIM 21 and the unique security key (individual subscriber authentication key), Ki, on the SIM. The response is transmitted back to the MSC 23 or SGSN which checks it against information that it has obtained for that subscriber from the G-HLR 25 in order to complete the authentication process. If the response from the terminal 20 is as expected, the mobile terminal 20 is deemed authenticated. This authentication process will be discussed in more detail below.

The authentication process will be repeated at regular intervals while the mobile terminal remains activated and can also be repeated each time the mobile terminal makes or receives a call, if required (this process is known as "paging").

When the user of the mobile terminal 20 wishes to establish a data connection, having already inserted the SIM 21 into the reader associated with the mobile terminal and the validity of the SIM has been confirmed by the G-HLR 25 in the manner described, the request for a data connection is passed to a network gateway component (i.e. SGSN) and a gateway session is established.

As is described above, the IMSI and Ki on the SIM are coupled together and intrinsically linked, so that when challenged by the G-HLR 25 the SIM 21 can produce an appropriate response. The authentication centre, in this case the G-HLR 25, will use the IMSI it has been forwarded by the location register, and look up the Ki associated with that IMSI in its database. The Ki is the individual subscriber authentication key intrinsically paired with the IMSI as described above. It is a 128 bit number that is paired with an IMSI when the SIM card is created. The Ki is only stored on the SIM card and at the authentication centre. The authentication centre also generates a 128 bit random number which is called the RAND. The RAND is referred to as the "challenge" in the above description.

Figure 4:
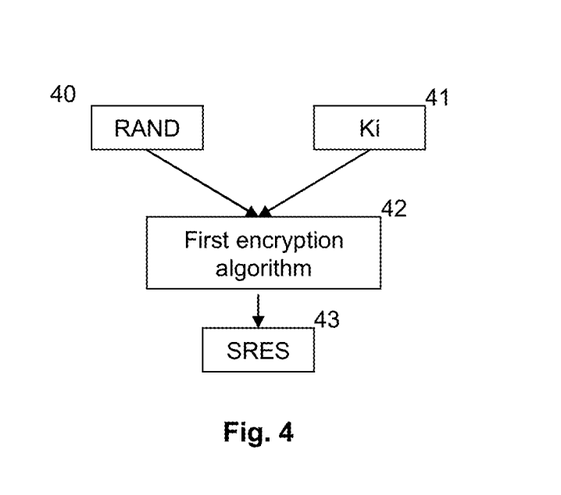
FIG. 4 shows a known process of generating a signed response.
Figure 5:
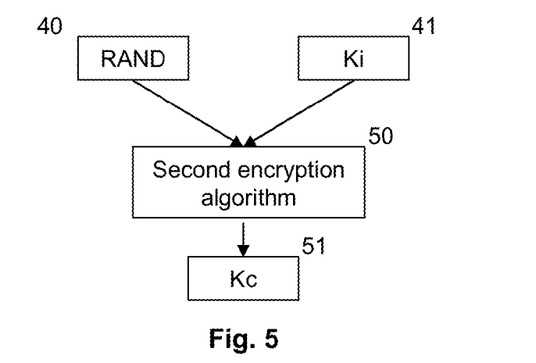
FIG. 5 shows a known process of generating a cipher key.

FIGS. 4 and 5 demonstrate the generation of SRES 43 and Kc 51 which will be described below. The RAND 40 and Ki 41 are inputted into an encryption algorithm 42, the output of which is called the signed response (SRES) 43 which is 32 bits. This SRES 43 is referred to as the "response" above and sent to the MSC by the G-HLR when authentication is requested. The SRES is never transmitted to the device by the MSC but is withheld as the expected response that is to be checked against the actual response transmitted to the MSC by the device.

Figure 6:
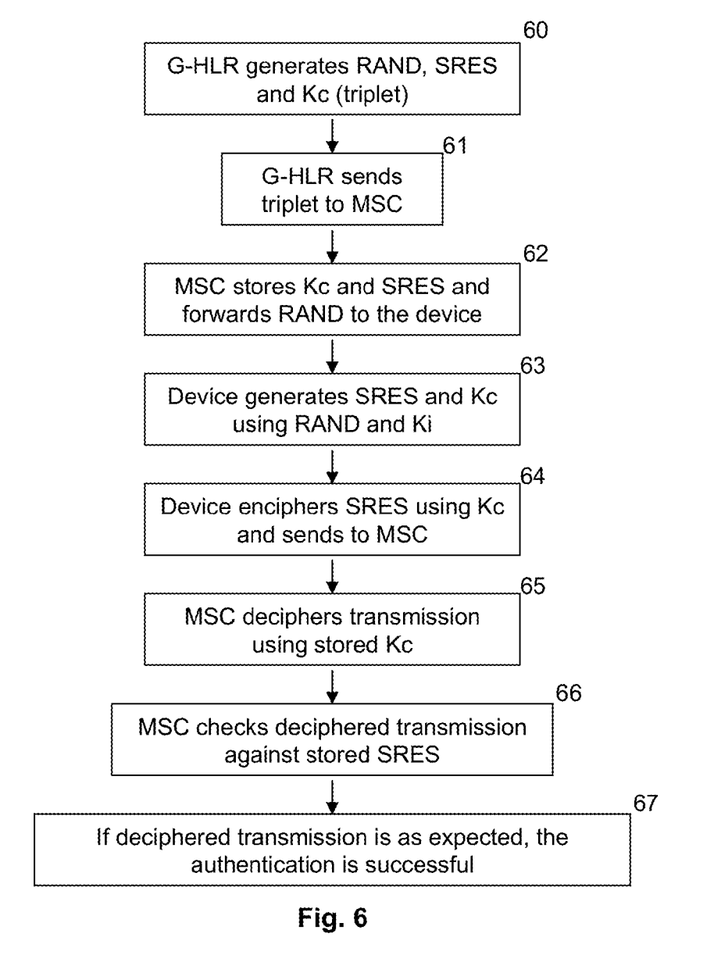
FIG. 6 shows an authentication process according to an embodiment of the present invention.

FIG. 6 shows the process of authentication described below. At the authentication centre (step 60), the RAND 40 and Ki 41 are input into a further encryption algorithm 50 of which the output is a 64 bit number known as Kc 51. A Kc 51 is the ciphering key that is used in a further encryption algorithm 50 to encipher and decipher the data that is being transmitted between the device and the base station. The RAND 40, SRES 43 and Kc 51 are collectively known as the 'triplets' (or quintuplet on 3G networks where the authentication is more comprehensive). The authentication centre may generate many sets of triplets and send them to the requesting MSC. This is in order to reduce the signalling overhead that will result if the MSC requested one set of triplets every time it wanted to authenticate the device. It should be noted that a set of triplets is unique to one IMSI and cannot be used with any other IMSI.

The encryption algorithms 42 and 50 use a variety of information such as the IMSI, the Ki and time stamp information. This ensures that the information is only valid for that authentication process. There can be no sharing of algorithms between location registers to ensure that the system is secure.

Once the authentication centre has generated the triplets it forwards them to the requesting MSC (step 61). The MSC stores the Kc and the SRES, as shown in step 62, but forwards the RAND to the device and orders it to authenticate itself. The device has the Ki stored on the SIM. The encryption algorithms are also stored on the SIM. The RAND and Ki are inputted into the encryption algorithms to generate the SRES and Kc respectively (step 63). The device enciphers the SRES with the Kc and sends it to the MSC (step 64). This "response" is checked against the expected response, as shown in steps 65 and 66, and, as described above, if the response from the mobile terminal is expected, the mobile terminal is deemed authenticated (step 67).

Central to the encryption process and security of the network is that the Ki is never transmitted across the network on any link and cannot (using presently available supercomputers) be calculated within a reasonable timescale using any of the transmitted signals. As the IMSI is an essential part of the encryption process, it is conventionally key that these are intrinsically linked for the network to be secure.

When a device attempts to roam onto a network that is not the home network, the VLR of the visited network, having no knowledge of the IMSI of the SIM, interrogates the home network. If an agreement is in place between the two networks, the VLR and HLR (or G-HLR) communicate to authenticate the device on the network and allow it roaming access. If no agreement is in place between the networks, then connection will be refused and the device cannot access the network.

An exemplary embodiment of the present invention is shown in FIG. 2 and will now be described in the above context, i.e. a telecommunications network comprising a system of HLRs and VLRs pointing to a global HLR for particular IMSIs. In the present invention, the relationship between the IMSI and Ki is broken. A conventional SIM comprises an electrical mask ensuring this one to one, IMSI-Ki, relationship. The electrical mask of the SIM of the present invention contains multiple IMSIs and only one common Ki, the Ki associated with each of the multiple IMSIs and stored on the SIM 22.

A known HLR or G-HLR, contains a store of IMSIs and their associated Kis. The G-HLR 25 of the present invention contains a store 26 of IMSIs associated with the same common Ki that is associated with the IMSI on the SIM. In this way, when the authentication procedure takes place, the challenge and response are generated using the IMSI and Ki of that database. Thus the same IMSI and Ki which are stored on the SIM 22 are used to generate the required response. As such, the Ki is never transmitted and the security of the system is maintained but the SIM can be authenticated using a plurality of different IMSIs.

Notably, the SIM may contain multiple Kis and multiple IMSIs, one Ki being associated with at least two IMSIs. For example, two Kis may be stored on the SIM, along with any number of unique identifiers. This may have application in a telecommunications system with multiple G-HLRs each storing one common Ki and a plurality of associated IMSIs. Security is maintained as only one component in the network stories the Ki. Authentication requests would be forwarded to the relevant G-HLR by the location register of the network in dependence on the IMSI used by the SIM.

Figure 7:
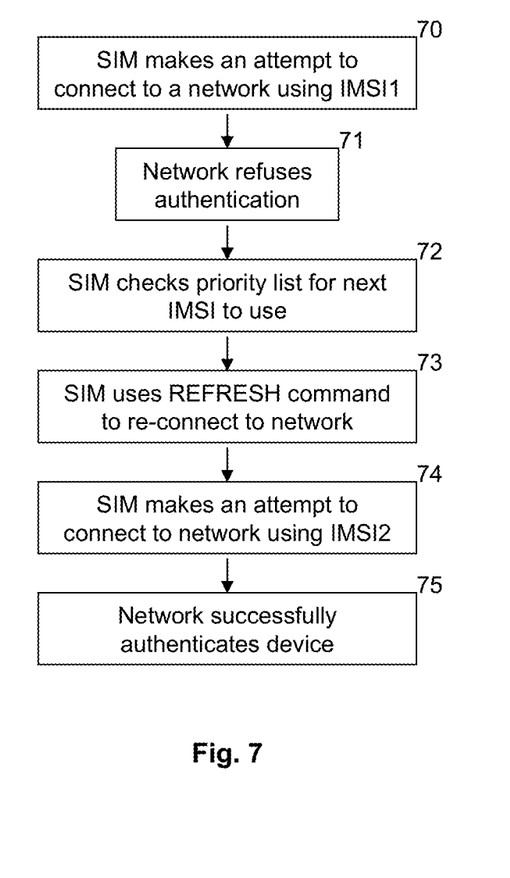
FIG. 7 shows a process of attempting to connect to a telecommunications network according to an embodiment of the present invention.

On attempting to connect to a network, the SIM must make a first attempt using a first IMSI and associated Ki stored on the device. This exemplary process is shown in FIG. 7. For the SIM to know which stored IMSI to use, the SIM has stored on it a priority list of IMSIs. This is in effect a predetermined sequence of IMSIs to be used. In turn, the SIM card attempts to connect to the network using the IMSIs, the authentication information being generated using the associated common Ki. If the first IMSI and Ki is rejected by the network (steps 70 and 71) the next IMSI of the priority list is attempted (steps 72, 73 and 74), once again generating the authentication information using the associated common Ki. This is done until a connection is established and the authentication is successful (step 75).

It would be assumed that in order to change the unique identifier of the SIM card and attempt to re-connect with the network a hard reboot of the device and SIM card would be required in order to re-present the device to the network with a different unique identifier. However, the present invention uses the 'REFRESH' command already a little used part of the conventional SIM standard in order to carry out the connection process again, as shown at step 73. Upon receipt of a 'REFRESH' command, the modem on the device re-reads all of the information from the SIM and re-presents the device to the network without completely disconnecting. This could be described as an equivalent of a soft re-boot of the device controlled and managed by the SIM.

In essence, the SIM can now appear to originate from a variety of different networks when connecting to a network by attempting to connect using a variety of IMSIs, each associated with a different network. The visited network will either see the SIM as a native SIM and IMSI (i.e. originating from that network) or will allow connection of the device on the visited network only if there is an agreement in place between the originating network of the IMSI (that the SIM uses) and the visited network.

The SIM may also autonomously decide to alter the unique identifier it presents to the network even if the unique identifier currently used is authenticated for the network. This may be done, for example, based on one or more criteria, including: service quality, network coverage, known network agreements, cost, and signal strength.

SIMs are usually based upon a 'Java' platform which provides a flexible base upon which to implement the described functionality, as well as any other functionality that may be desired.

Figure 8:
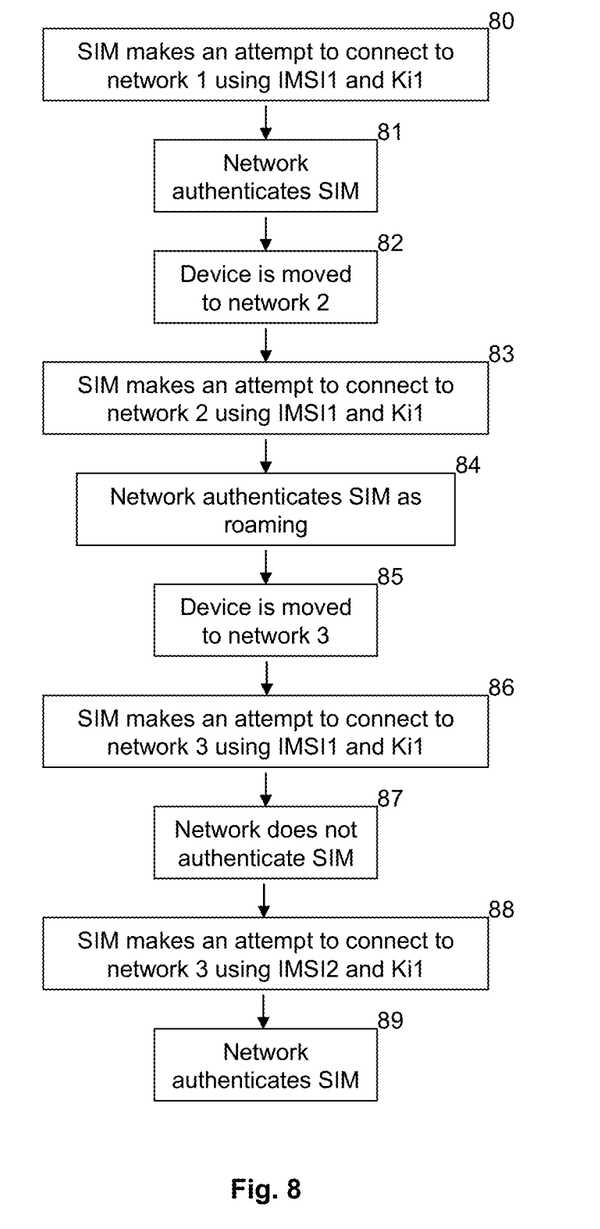
FIG. 8 shows an exemplary implementation of an embodiment of the present invention.

An exemplary implementation of the system of the present invention will now be described. A SIM of the present invention, installed into a device, is designed, manufactured and tested within the territory of a first network. The SIM contains a priority list with an IMSI associated with the first network at the top; the IMSI being associated with a common Ki. When the SIM is first powered up, it attempts to connect to the first network using the first IMSI and its associated common security key (step 80). The authentication process is successful with the network as the G-HLR, in communication with the network, stores both the IMSI and the associated common Ki (step 81).

The device is transferred to a second territory for sale (step 82). The device will attempt to connect with a network in the second territory using the first IMSI and the common Ki as these are at the top of the priority list (step 83). The second network does not recognise the IMSI as part of its network and so it requests the first network to confirm that it can authenticate the device. As the first and second networks have a agreement in place, the G-HLR authenticates the device for use on the second network as a roaming device (step 84).

The device is then transferred after sale to a third territory (step 85). The device attempts to connect with a network in the third territory using the first IMSI and the common Ki as these are at the top of the priority list (step 86). The third network does not recognise the IMSI as part of its network. As the third and first networks have no agreement in place, the SIM is not authenticated for use on the third network (step 87).

The second IMSI stored on the SIM in the priority list is an IMSI originating from the third network. This has the same common security key (Ki) associated with it as the first IMSI on the SIM. Once the first IMSI has been rejected by the network, the SIM re-presents itself to the network using the second IMSI (step 88). The third network identifies the second IMSI it receives from the SIM and determines that it originates from the network but that it corresponds to the G-HLR. The network communicates with the G-HLR in order to authenticate the device on the network. Stored on the G-HLR is the second IMSI and the same common Ki associated with that IMSI on the SIM. The G-HLR authenticates the device for the third network and the device is then able communicate with the third network as a native device since the IMSI used belongs to that network (step 89).

The above exemplary scenario is only one of a wide variety of possible scenarios enabled by the present invention. As will be readily understood, the present invention provides for full testing and manufacture in one territory, testing, demonstration and sale in another before final implementation in a third territory without the expensive and logistically challenging requirement that a different and specific SIM be used in each territory.

Figure 9:
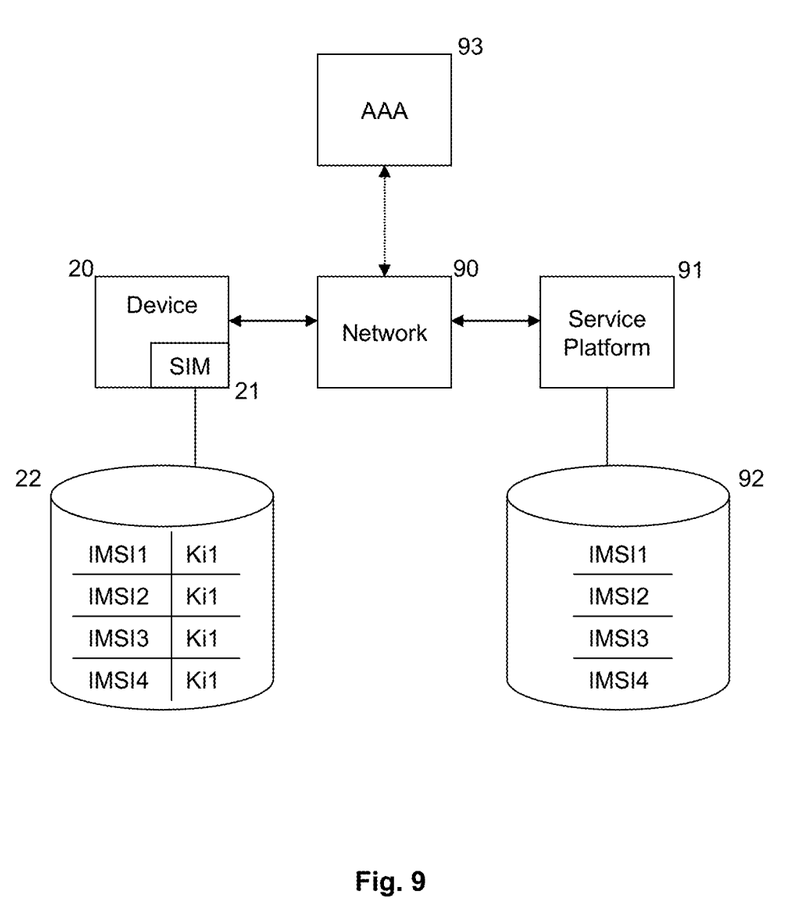
FIG. 9 shows a second embodiment of the present invention.

Additional functionality can be provided to the SIM and device with the provision of a service platform 91, as shown in FIG. 9. This can be located anywhere. For example, where a group of networks are all owned or controlled in common, the service platform can be located at the controlling entity. Although much of the functionality described herein is described in context with a service platform, it would be understood that the same functionality may be implemented by different components of the system.

The service platform 91 is in communication with the system and G-HLR which forms part of the network 90. The service platform may comprise, or be in communication with, a rules engine which is configurable by the controller of the service platform.

When the SIM 21 first communicates with the G-HLR, the G-HLR forwards information to the service platform 91 regarding the location and information of the SIM and the devices that are attempting to connect to the G-HLR. With this information, and knowledge of the priority list stored on the device, the service platform, in conjunction with the rules engine and the information received from the device 20, can calculate the unique identifier the SIM should use or instruct the G-HLR to grant or deny the identity module access. This could be based on one or more criteria, including: service quality, network coverage, network agreements, cost, and signal strength for example. The service platform 91 may send a command through the network 90 to the SIM to change unique identifiers to a new unique identifier.

Additionally, the service platform may instruct the G-HLR to authenticate the device, or not as the case may be, following instructions from an external authentication, authorisation and accounting (AAA) server 93 such as DIAMETER or RADIUS. The G-HLR may also communicate directly with the AAA server 93.

The service platform may also calculate the unique identifier to be used or instruct the G-HLR not to authenticate the device based upon device priority. For example, a 'smartphone' requesting a data connection may be granted authentication during busy network periods, whereas a 'smartmeter', for example used for transmitting electricity usage, may only be authenticated during periods where network traffic is low.

The service platform 91 may also instruct the SIM 21 to re-order the priority list stored on the SIM. Upon receiving such a request, the SIM 21 will re-order its priority list as instructed and then perform the aforementioned soft re-boot using the 'REFRESH' command and re-present itself to the network 90 with the first unique identifier of the new priority list. The service platform may then store the new priority list 92 for future calculations with the rules engine.

The information the SIM 21 transmits to the service platform 91 may include diagnostics. Based on these diagnostics, the service platform 91 may recalculate the unique identifier that the SIM should present. For example, if a first network A has an agreement with a second network B and a third network C has an agreement with fourth network D; networks B and D being local to the device and networks A and C being remote, the service platform may instruct the SIM to attempt to connect to network B using the unique identifier of network A and network D using the unique identifier of network C. The properties of both connections could then be evaluated by the service platform 91 and the SIM 21 instructed which unique identifier to use based upon the returned diagnostics.

In another example, the SIM has stored in its priority list, the unique identifiers of networks F and G, both of which are local to the device. If the SIM were to use unique identifier F, it would be able to connect to that network. If the SIM were to use unique identifier G, it would be able to connect to that network. The remote service platform can instruct the SIM to use a particular unique identifier based on the criteria described above.

At present, the type of 'active network steering' described in the above examples is not possible. If agreements are in place between the remote network and all of the local networks, the user of the device must manually change the network it connects to when roaming and receives no feedback on which local network would be most suitable. The service platform is able to detect which network would be most suitable for the device and instruct to the SIM to re-present using a different unique identifier to force a change in the connected local network.

An additional functionality of the SIM of the present invention is that, as the security keys are never transmitted or removed, the IMSIs stored on the device can be modified at will. The method of doing so will now be described.

Conventionally, as the IMSI and security key are intrinsically linked, it would not be possible to amend the IMSI remotely; it must be returned to the manufacturer. Remote amendment of the IMSI is however possible with the present invention. The service platform may first send a request to the SIM to add a new IMSI to its priority list. This may be the result of a new agreement between networks, or other factors. The method described above may be used to re-order the priority list so that the SIM connects using this IMSI if required. This reordering would be, once again, based on the rules engine in communication with the service platform. On the SIM, the new IMSI is associated with the common security key (Ki), and the IMSI and Ki are stored in the G-HLR for authentication accordingly. At no point is the security key transmitted. Additionally, an IMSI on the SIM may be deleted or modified upon request from the service platform and any modifications made, correspondingly amended in the G-HLR database. The IMSI may be deleted from the priority list but remain stored on the SIM to allow for it to be easily placed back at a later time or it may be purged from the SIM entirely. Both deletion and purge may occur upon instruction from the service platform.

An exemplary scenario where this may be advantageous, would occur if the service platform detects from the device that it has very poor coverage and signal strength. The service platform may identify that another network may provide better coverage in that area, and that if the SIM were to present itself using a different unique identifier, the SIM may be able to connect to that network and therefore establish a better connection for the device.

Although it is advantageous to use a central service platform for managing the SIM, this is not essential. Instead, the necessary functions could be carried out by various components of the system. In such an alternative example, the G-HLR upon receiving an authentication request from the SIM, may refuse the authentication request, having knowledge of the priority list on the SIM. The G-HLR may be aware that if the SIM were to use the second unique identifier of the SIM, it would be more advantageous for the device. In this scenario, the unique identifier used by the SIM is controlled remotely without the use of the service platform.

Although the above has been described in relation to a mobile device, it would be understood that the machine-to-machine (M2M) implementation of a SIM described in WO 2009/122212 or WO 2009/122219, in which no MSISDN is required for full device functionality, may be implemented with this invention. The authentication by the G-HLR of the SIM and device is related to the IMSI and security key stored in its database and not the MSISDN of the device, which may be conventionally associated with the IMSI of the SIM. Additionally, it will be understood that the service platform and G-HLR are equally equivalent to other not described network environments such as 3G, or an SCP-based system for computer originating connections.

While terminals are often referred to as "mobile" in the preceding discussion the term "mobile" should not be construed to require that a terminal always be mobile, merely that it has the capability of being in communication with a wireless telecommunications network which allows mobility. For instance, a PC terminal or a M2M client that is never moved from a particular geographic location may in a sense still be considered mobile as it could be moved to a different location yet still access the same network. Where the term "mobile terminal" is used in the present discussion it is to be read as including the possibility of a terminal that is "semi-permanent" or even "fixed" where the context does not contradict such an interpretation.

Unless the context in which it is described implies to the contrary, a network may be considered as comprising a local register, relating to a particular territory and operated by a particular network operator. There may be more than one network located in a particular territory but operated by a different network operator. The networks may be both 'mobile networks' and 'mobile virtual networks' operated by MNOs (Mobile Network Operators) and MVNOs (Mobile Virtual Network Operators), respectively. An MVNO may hold limited licences and operate a limited amount of network components whilst remaining capable of authenticating an identity module. It should be understood that the present invention is applicable to both mobile networks and mobile virtual networks equally. Further, although many of the networks that may make use of the present invention will be cellular, this need not always be the case, for example, a WiMAX based network may be considered wireless but not cellular.

The invention claimed is:

1. A telecommunications system comprising:
   a plurality of different wireless telecommunications networks;
   a smart card that (1) is registrable on each of the plurality of different wireless telecommunications networks and (2) includes multiple unique identifiers, each of the multiple unique identifiers being associated with a respective one of the plurality of different wireless telecommunications networks, wherein the multiple unique identifiers are included in a priority list that orders the multiple unique identifiers into a predetermined sequence that is based on determined priorities of the multiple unique identifiers;
   a service platform that communicates with the plurality of different wireless telecommunications networks; and
   a mobile device, operative in accordance with the smart card, to communicate with each of the plurality of different wireless telecommunications networks when the smart card is registered on that network,
   wherein the smart card comprises a common security key associated with at least two of the multiple unique identifiers such that the smart card is registrable with each one of the plurality of different wireless telecommunications networks when a corresponding unique identifier and the common security key are authenticated for a selected wireless telecommunications network that is selected for current registration,
   wherein the smart card is associated with an encryption algorithm that is used to generate the common security key which is associated with the at least two of the multiple unique identifiers such that the at least two of the multiple unique identifiers are linked to the encryption algorithm,
   wherein the smart card attempts to connect to one of the plurality of wireless telecommunications networks by interchangeably selecting for use one or more of the multiple unique identifiers in accordance with the predetermined sequence, the interchangeably selecting for use ending at least when a connection is established,
   wherein the service platform is operative to instruct the smart card to reorder the predetermined sequence of the multiple unique identifiers, wherein the smart card is operative to reorder the predetermined sequence of the multiple unique identifiers upon instruction,
   wherein the reordered sequence of the multiple unique identifiers is at least partially dependent on a predicted device functionality for the mobile device, the predicted device functionality being determined for each of the plurality of different wireless telecommunications networks,
   wherein the smart card is configured such that, when a particular unique identifier, which is included among the multiple unique identifiers, is deleted from the priority list, the particular unique identifier (i) is no longer interchangeably selectable for use to connect the smart card to any wireless telecommunications network included in the plurality of wireless telecommunications networks and (ii) remains stored on the smart card even after being deleted from the priority list, and
   wherein the particular unique identifier, after being deleted from the priority list, is subsequently either (i) purged from the smart card or (ii) placed back into the priority list such that the particular unique identifier again becomes interchangeably selectable for use to connect the smart card to at least one wireless telecommunications network included in the plurality of wireless telecommunications networks.

2. The telecommunications system according to claim 1, wherein the system comprises an authentication server for authenticating the unique identifier and the common security key, which are usable to connect to the plurality of different wireless networks.

3. The telecommunications system according to claim 2, wherein the authentication server comprises a database for storing the at least two unique identifiers and common security key, each unique identifier being associated with the common security key in the database.

4. The telecommunications system according to claim 2, wherein each of the plurality of different wireless networks comprises a local location register for receiving access requests from the mobile device, the local location register being operative to redirect each access request to a central location register, wherein the central location register includes the authentication server.

5. The telecommunications system according to claim 4, wherein the central location register is operative to instruct the local location register to grant the mobile device network access if an authentication performed by the authentication server is successful.

6. The telecommunications system according to claim 2, wherein the authentication server authenticates the smart card for a particular network using a particular unique identifier in dependence on one or more criteria selected from a group comprising cellular coverage, signal strength, cost, service quality, device priority and predicted device functionality on the network.

7. The telecommunications system according to claim 1, wherein, when the smart card attempts to connect to one of the plurality of different wireless networks using the multiple unique identifiers, a determination as to which unique identifier to use is based on one or more predetermined criteria selected from a group comprising cellular coverage, signal strength, cost, service quality, device priority and predicted device functionality on the network.

8. The telecommunications system according to claim 1, wherein the predetermined sequence is retained on a card as sequence data.

9. The telecommunications system according claim 1, wherein power is maintained to the mobile device when the smart card attempts to connect using the multiple unique identifiers.

10. The telecommunications system according to claim 1, wherein the service platform is operative to transmit a new unique identifier to the smart card and an authentication server to be associated with the common security key and, upon receipt of the new unique identifier, the smart card is operative to add the new unique identifier to the predetermined sequence.

11. The telecommunications system according to claim 1, wherein the service platform is operative to instruct the smart card to delete a unique identifier from the predetermined sequence and, upon instruction, the smart card is operative to delete the unique identifier from the predetermined sequence.

12. The telecommunications system according to claim 1, wherein the service platform is operative to instruct the smart card to purge a unique identifier from the smart card and, upon instruction, the smart card is operative to purge the unique identifier from the smart card.

13. The telecommunications system according to claim 1, wherein the service platform is operative to instruct the smart card and an authentication server to modify one or more of the unique identifiers stored on the smart card and the authentication server and associated with the common security key and, upon instruction, the smart card and the authentication server are operative to modify one or more of the stored unique identifiers associated with the common security key.

14. A method of using a telecommunications system that includes a plurality of different wireless telecommunications networks, the method comprising:
  registering a smart card on a first one of the plurality of different wireless telecommunications networks in accordance with a first unique identifier;
  registering the smart card on a second one of the plurality of different wireless telecommunications networks in accordance with a second unique identifier, wherein:
    the smart card comprises a common security key associated with the first and second unique identifiers,
    the smart card is registered on a respective wireless telecommunications network when a unique identifier and an associated security key are authenticated for that respective wireless telecommunications network,
    the smart card is associated with an encryption algorithm that is used to generate the common security key which is associated with the first and second unique identifiers such that the first and second unique identifiers are intrinsically linked to the same encryption algorithm, and
  wherein the first and second unique identifiers are included among multiple unique identifiers, the multiple unique identifiers being included in a priority list that orders the multiple unique identifiers into a predetermined sequence that is based on determined priorities of the multiple unique identifiers;
  providing a service platform;
  attempting to register the smart card on one of the plurality of wireless telecommunications networks using the first and second unique identifiers in accordance with a predetermined sequence;
  having the service platform instruct the smart card to reorder the predetermined sequence of first and second unique identifiers;
  having the smart card reorder the predetermined sequence of the first and second unique identifiers upon instruction; and
  having the service platform calculate the reordered sequence of the first and second unique identifiers in dependence on a predicted device functionality for a mobile device that includes the smart card, the predicted device functionality being determined for each of the plurality of different wireless telecommunications networks,
  wherein the smart card is configured such that, when a particular unique identifier, which is included among the multiple unique identifiers, is deleted from the priority list, the particular unique identifier (i) is no longer interchangeably selectable for use to connect the smart card to any wireless telecommunications network included in the plurality of wireless telecommunications networks and (ii) remains stored on the smart card even after being deleted from the priority list, and
  wherein the particular unique identifier, after being deleted from the priority list, is subsequently either (i) purged from the smart card or (ii) placed back into the priority list such that the particular unique identifier again becomes interchangeably selectable for use to connect the smart card to at least one wireless telecommunications network included in the plurality of wireless telecommunications networks.

15. The method according to claim 14, wherein the first and second ones of the plurality of wireless telecommunications networks are a same network.

16. The method according to claim 14, further comprising providing an authentication server and, at the authentication server, authenticating the unique identifier and the associated common security key on the first or second ones of the plurality of networks.

17. The method according to claim 16, further comprising, at the authentication server, storing the first and second unique identifiers and common security key, each unique identifier being associated with the common security key.

18. The method according to claim 16, further comprising providing a local location register and, at the local location register, receiving a network access request from the mobile device in accordance with the smart card and redirecting the network access request to a central location register in accordance with the unique identifier, said central location register comprising the authentication server.

19. The method according to claim 18, further comprising, at the central location register, instructing the local location register to grant network access if an authentication performed by the authentication server is successful.

20. The method according to claim 14, further comprising, at the smart card, storing the predetermined sequence as sequence data.

* * * * *